United States Patent [19]
Sasaki

[11] Patent Number: 4,785,955
[45] Date of Patent: Nov. 22, 1988

[54] VACUUM CONTAINER FOR HEAT-VACUUM TEST CHAMBER

[75] Inventor: Tatsuo Sasaki, Kodaira, Japan

[73] Assignee: Kabushiki Kaisha Toshiba, Kawasaki, Japan

[21] Appl. No.: 79,992

[22] Filed: Jul. 31, 1987

Related U.S. Application Data

[63] Continuation-in-part of Ser. No. 669,734, Nov. 8, 1984, abandoned, which is a continuation of Ser. No. 533,885, Sep. 20, 1985, abandoned, which is a continuation of Ser. No. 274,289, Jun. 15, 1981, abandoned.

[30] Foreign Application Priority Data

Jun. 24, 1980 [JP] Japan ................... 55-85448

[51] Int. Cl.⁴ .............................................. A47J 41/00
[52] U.S. Cl. ........................................ 220/3; 220/414; 220/417
[58] Field of Search ............... 220/3, 3.1, DIG. 23, 220/83, 457, 414; 73/432 SD

[56] References Cited

U.S. PATENT DOCUMENTS

| | | | |
|---|---|---|---|
| 2,888,042 | 5/1959 | John et al. | 220/457 |
| 3,074,585 | 1/1963 | Koontz | 220/83 |
| 3,124,001 | 3/1964 | Conley | 220/3 |
| 3,138,507 | 6/1964 | Wiltshire | 220/3 |
| 3,224,277 | 12/1965 | Chamberlin et al. | 73/432 SD |
| 3,381,842 | 5/1968 | Vayson | 220/3 |
| 3,508,677 | 4/1970 | Laibson et al. | 220/3 |
| 3,680,727 | 8/1972 | Pearson | 220/3 |
| 4,242,406 | 12/1980 | Bovhnini et al. | 428/236 |

*Primary Examiner*—Joseph Man-Fu Moy
*Attorney, Agent, or Firm*—Cushman, Darby & Cushman

[57] ABSTRACT

The invention discloses a vacuum container for a heat-vacuum test chamber used for testing equipment mounted on a satellite or the like. A body of the vacuum container comprises an outer layer intended for mechanical reinforcement, an intermediate layer (main body) formed of a fiber-reinforced epoxy resin and intended to suppress the possibility of decomposed gas generation as much as possible, and an inner layer (voidless layer) formed inside the intermediate layer.

5 Claims, 1 Drawing Sheet

VACUUM CONTAINER FOR HEAT-VACUUM TEST CHAMBER

CROSS REFERENCES TO THE RELATED APPLICATIONS

This is a continuation-in-part application of U.S. Ser. No. 669,734 filed Nov. 8, 1984, now abandoned, which in turn is a continuation application of U.S. Ser. No. 533,885 filed Sept. 20, 1983, abandoned, which in turn is a continuation application of U.S. Ser. No. 274,289 filed June 15, 1981, abandoned.

BACKGROUND OF THE INVENTION (a) Field of the Invention

The present invention relates to a vacuum container for a heat-vacuum test chamber or the like.

(b) Description of the Prior Art

A heat-vacuum test chamber as used in this specification is a device for simulating the thermal and vacuum environment encountered by satellites, satellite equipment and so on in space orbits. A test sample is placed in a vacuum container of this device to confirm its ability to resist various environmental factors. Such a heat-vacuum test chamber is used for testing not only equipment related to space but also aeronautical and ground equipment.

Since the vacuum container of a conventional heat-vacuum test chamber is made of metal, electromagnetic waves radiated by a sample placed in the vacuum container do not penetrate the walls of the vacuum container. For this reason, the interference between electromagnetically interfering equipment such as an electron tube which operates only in a vacuum and other equipment cannot be checked. Furthermore, when a sample to be tested with plasma or the like has a high voltage circuit, phenomena occur such as electrical discharge inside the vacuum container, at the lead-in terminal and so on, and the testing becomes difficult to perform.

Therefore, a conventional heat-vacuum test chamber or a vacuum testing device has been limited with respect to its impermeability to electromagnetic waves and to its safety requirements related to high voltage power sources due to the fact that the material of the vacuum container is a metal such as SUS.

SUMMARY OF THE INVENTION

The present invention has been made in view of the above and has for its object to provide a vacuum container for a heat-vacuum test chamber, which is highly permeable to electromagnetic waves, which is highly suited for maintaining a high vacuum within the container, which has good electrical insulation, and which does not cause electrical discharge and is therefore safe.

In order to accomplish this object, the present invention provides a vacuum container which is highly permeable to electromagnetic waves for simulating a thermal environment and a vacuum environment in space of about $10^{-10}$ Torr, said container comprising walls having; an inner voidless layer consisting of epoxy resin layers and glass film layers which are alternately laminated; an outer layer of a thermosetting resin fiber reinforced plastic, the thermosetting resin of said outer layer being different from the epoxy resin of said inner voidless layer; and a core layer disposed between said inner voidless and said outer layers, said core layer consisting of a low gas emission layer of epoxy resin fiber reinforced plastic, wherein said inner voidless, outer and core layers are adhered to one another to form a unitary structure.

DETAILED DESCRIPTION OF THE PREFERRED EMBODIMENT

The present invention will now be described by way of its examples with reference to the accompanying drawings.

Figure 1:
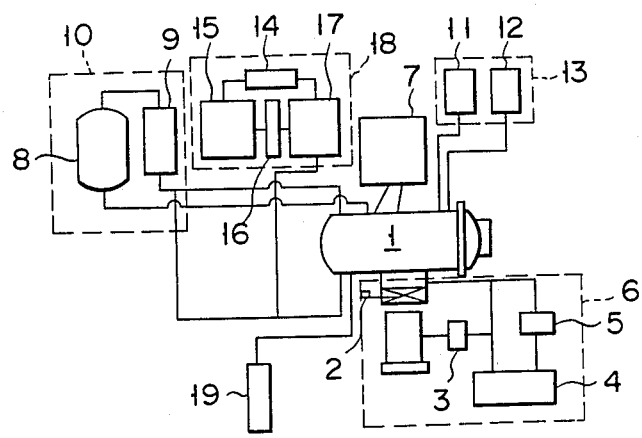
FIG. 1 is a block diagram showing the construction of a heat-vacuum test chamber incorporating a vacuum container according to the present invention.

FIG. 1 schematically shows the construction of a heat-vacuum test chamber incorporating a vacuum container according to the present invention. The heat-vacuum test chamber comprises a vacuum container 1; an exhaust system 6 consisting of a vacuum valve 2 for maintaining a vacuum inside the vacuum container 1, a liquid nitrogen trap 3, an oil hydraulic rotary pump 4, and a mechanical booster 5; a solar simulator 7 to simulate sun rays; a liquid nitrogen supply device 10 for a shroud consisting of a liquid nitrogen storage tank 8 and a liquid nitrogen recovery device 9 for simulating the cold and dark environment of space; a heating and cooling device 13 consisting of a heating tank 11 for heating up the vacuum container 1 and a cooling tank 12; a cryopump 18 consisting of a control panel 14, a helium compressor 15, a filter 16, and a helium condenser 17; a gas analyzer 19; and so on. This heat-vacuum test chamber is utilized for testing space, aeronautical and ground equipment.

Figure 2:
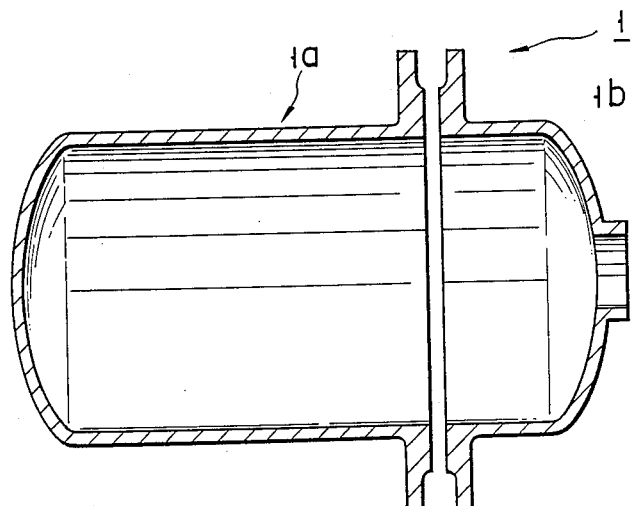
FIG. 2 is a sectional view of the main part of a vacuum container according to the present invention.

The vacuum container 1 comprises, for example, as shown in FIG. 2, a test sample housing 1a (1 m in inner diameter, 1.5 m in inner length) with one open end and a lid 1b for tightly sealing this open end. The interior of the container 1 can be evacuated. The mechanism for evacuating the vacuum container 1 is not specifically different from a conventional mechanism. Therefore, the description thereof will be omitted.

Figures 3, 4:
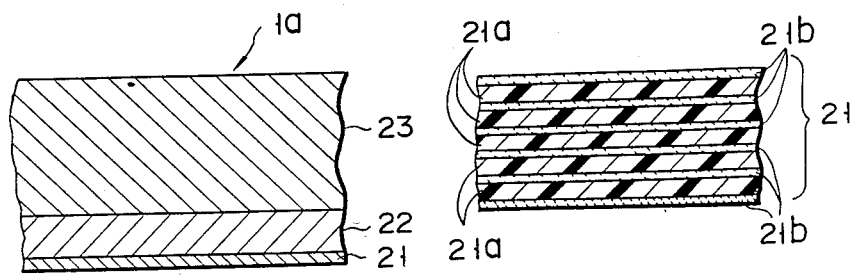
FIGS. 3 and 4 are enlarged sectional views illustrating the walls of a vacuum container according to the present invention.

The test sample housing 1a of the vacuum container 1 consists generally of three layers of thermosetting resin as shown in FIG. 3. An inner layer comprises a voidless layer 21 about 2 mm in thickness and consisting of more than two, preferably at least four epoxy resin layers 21a and more than three, preferably at least five glass film layers 21b which are alternately laminated as shown in FIG. 4. Over this voidless layer 21 is formed a low gas emission FRP layer (core layer) 22 of, for example, an epoxy resin FRP (fiber reinforced plastic). Outside this FRP layer 22 is formed a thermosetting resin FRP layer 23 of, for example, an unsaturated polyester FRP or the like. The voidless layer 21, the low gas emission layer 22, and the FRP layer 23 are superposed on each other and are adhered to form a unitary structure.

The voidless layer serve to prevent the gas which may be generated out of the core layer 22 from entering the container 1.

The epoxy FRP according to the present invention may be prepared by condensation of epichlorohydrin or the like with bisphenol A, bisphenol F, tetrachlorobisphenol, diphenolic acid, a novolak resin or the like to obtain an epoxy resin; mixing the epoxy resin with glass fiber, carbon fiber, graphite fiber, nitrided boron fiber or the like as a reinforcing material; curing the mixture with a curing agent such as an amine e.g., benzyldimethylamine or diethylenetriamine, or an organic acid anhydride e.g., phthalic anhydride or maleic anhydride. The particular combination of these components may be suitably selected by those skilled in the art depending upon the purpose of the vacuum container.

The thicknesses of the voidless layer 21, the epoxy FRP layer 22, and the FRP reinforcing layer 23 depend on the size such as diameter of the vacuum container, the required vacuum and so on and may be suitably selected according to these conditions. When the inner surface of the vacuum container consists only of the low gas emission FRP layer 22 of an epoxy FRP or the like, voids tend to remain at the inner surface, causing the layer to peel off when the container is evacuated.

The construction of the respective layers for the test sample housing 1a is similarly applicable to the lid 1b. The FRP reinforcing layer 23 need not be made of an unsaturated polyester FRP but may be made of other thermosetting resin FRPs which are of excellent mechanical strength.

The vacuum container of this invention can be manufactured as follows.

First, a core mold, 1 m in diameter, 1.5 mm in length, which conforms with the inner space of the housing 1a shown in FIG. 2 is prepared. Then, a glass film (composition of which may be any of those generally employed for producing chemical instruments such as a bell jar, or silica glass) having a thickness of about 0.1 to 0.2 mm is formed on the surface of the were mold. Subsequently, an epoxy resin is coated on the surface of the glass film together with an amine curing agent. Upon curing of the epoxy resin layer, a glass film having the same composition and the thickness as previously employed is laminated on the epoxy resin layer. The lamination procedures of the epoxy resin layer and glass film are repeated respectively five or six times to obtain a voidless layer 21 having a thickness of about 2 mm.

Subsequently, a core layer about 6 mm in thickness and consisting of a low gas emission layer of epoxy resin fiber reinforced plastic (FRP) 22 is formed on the voidless layer 21. After the curing of epoxy resin FRP 22, an outer layer of a thermosetting resin FRP (e.g., unsaturated polyester resin FRP) 23 about 17 mm in thickness is laminated on the epoxy resin FRP layer 22. Finally, the core mold is removed after the thermosetting resin FRP 23 is fully cured to obtain the vacuum container.

According to the present invention, the amount of the emitted gas, which is critical to the vacuum container, is made very small and the structure of the container is so constructed to secure sufficient mechanical strength and rigidity to provide a satisfactory external pressure container. Thus, the vacuum container can maintain low pressures and vacuums from atmospheric pressure to about $10^{-10}$ Torr.

By forming the vacuum container 1 with an FRP of a laminated structure as mentioned above, permeability to electromagnetic waves, adequate electrical insulation and safety attributable to the FRP may be obtained. For example, for testing electromagnetically interfering equipment which operates in a vacuum such as an electron tube, the interference of it with other equipment may be checked or measured. Furthermore, the vacuum container is electrically safe and has good shock resistance.

What is claimed is:

1. A vacuum container which is highly permeable to electromagnetic waves for simulating a thermal environment and a vacuum environment in space of about $10^{-10}$ Torr, said container comprising walls having;
    an inner voidless layer consisting of epoxy resin layers and glass film layers which are alternately laminated;
    an outer layer of a thermosetting resin fiber reinforced plastic, the thermosetting resin of said outer layer being different from the epoxy resin of said inner voidless layer;
    a core layer disposed between said inner voidless and said outer layers, said core layer consisting of a low gas emission layer of epoxy resin fiber reinforced plastic; and
    said inner voidless, outer and core layers being adhered to one another to form a unitary structure.

2. A vacuum container according to claim 1, wherein said outer layer of a thermosetting resin fiber reinforced plastic is a polyester resin fiber reinforced plastic.

3. A vacuum container according to claim 1, wherein the diameter of said container is 1 m, thickness of said inner voidless layer is 2 mm, thickness of said core layer is 6 mm and thickness of said outer layer is 17 mm.

4. A vacuum container according to claim 1, wherein said inner voidless layer is consisted of at least two epoxy resin layers and at least three glass layers, which are alternately laminated.

5. A vacuum container according to claim 4, wherein each of said glass layers has a thickness of 0.1 to 0.2 mm.

* * * * *